United States Patent [19]

Kuklo

[11] Patent Number: 5,359,246

[45] Date of Patent: Oct. 25, 1994

[54] LOW BACKLASH DIRECT DRIVE ACTUATOR

[75] Inventor: Thomas C. Kuklo, Oakland, Calif.

[73] Assignee: The United States of America as represented by the United States Department of Energy, Washington, D.C.

[21] Appl. No.: 89,916

[22] Filed: Jul. 12, 1993

[51] Int. Cl.$^5$ .............................................. H02K 37/24
[52] U.S. Cl. ...................................... 310/49 R; 464/73
[58] Field of Search ............. 310/49 R, 75 R; 464/69, 464/70, 71, 73

[56] References Cited

U.S. PATENT DOCUMENTS

| | | | |
|---|---|---|---|
| 3,813,898 | 6/1974 | Hatch | 464/65 |
| 5,212,417 | 5/1993 | Nagai et al. | 310/49 R |
| 5,226,852 | 7/1993 | Asaba et al. | 464/4 |

Primary Examiner—Steven L. Stephan
Assistant Examiner—Judson H. Jones
Attorney, Agent, or Firm—Miguel A. Valdes; Roger S. Gaither; William R. Moser

[57] ABSTRACT

A low backlash direct drive actuator is described which comprises a motor such as a stepper motor having at least 200 steps per revolution; a two part hub assembly comprising a drive hub coaxially attached to the shaft of the motor and having a plurality of drive pins; a driven hub having a plurality of bores in one end thereof in alignment with the drive pins in the drive hub and a threaded shaft coaxially mounted in an opposite end of the driven hub; and a housing having a central bore therein into which are fitted the drive hub and driven hub, the housing having a motor mount on one end thereof to which is mounted the stepper motor, and a closed end portion with a threaded opening therein coaxial with the central bore in the housing and receiving therein the threaded shaft attached to the driven hub. Limit switches mounted to the housing cooperate with an enlarged lip on the driven hub to limit the lateral travel of the driven hub in the housing, which also acts to limit the lateral travel of the threaded shaft which functions as a lead screw.

21 Claims, 3 Drawing Sheets

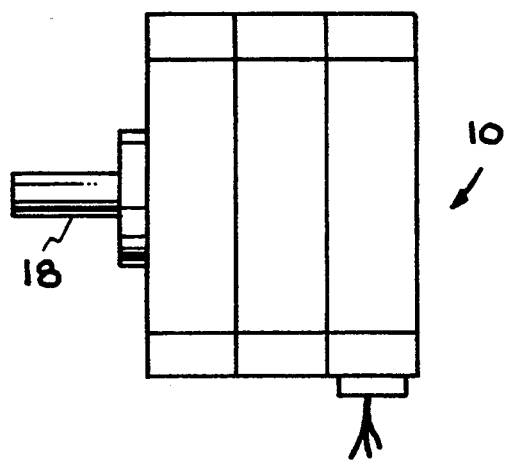
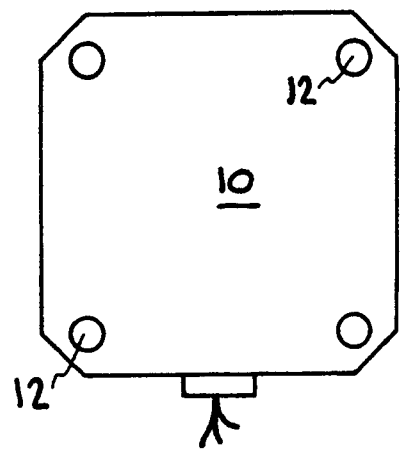
FIG. 2  FIG. 3
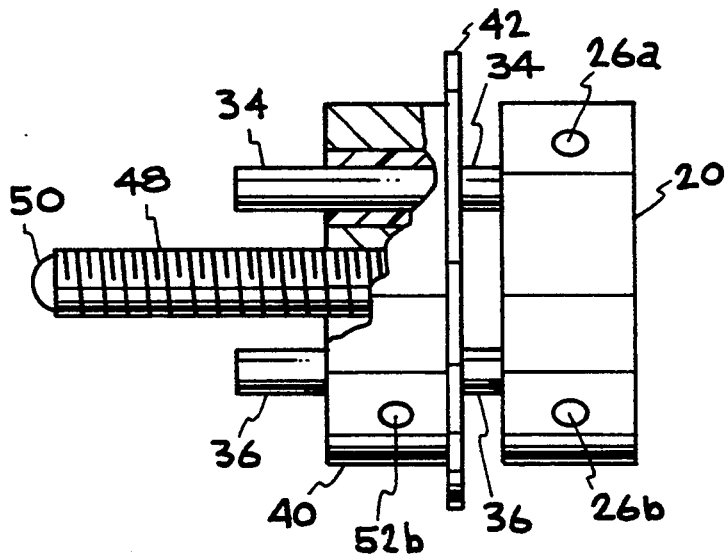
FIG. 4
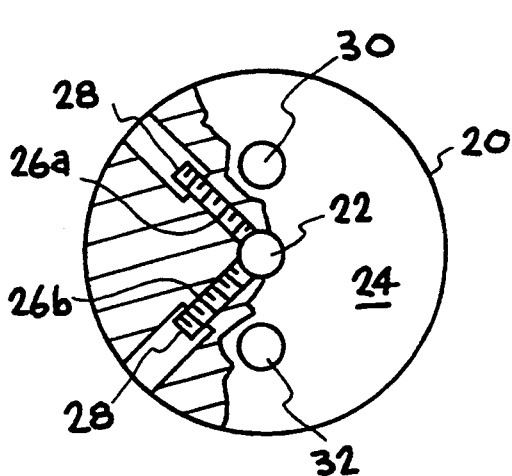
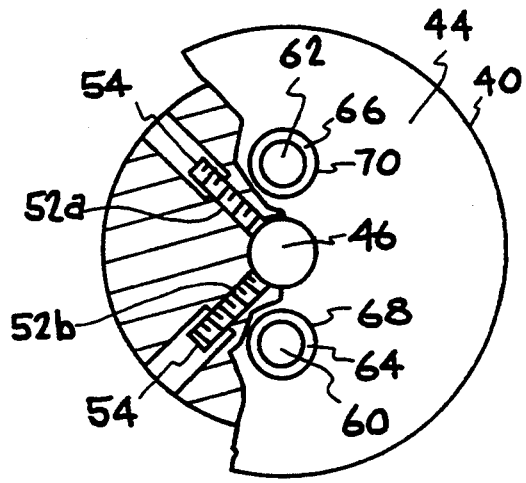
FIG. 5  FIG. 6

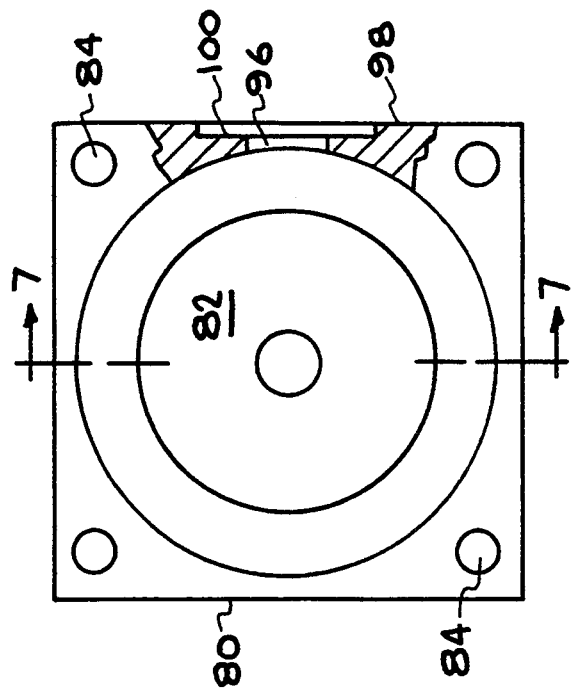
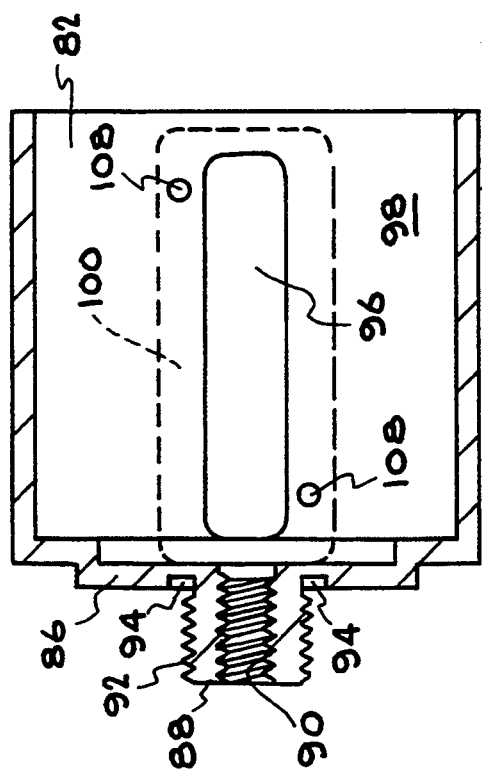
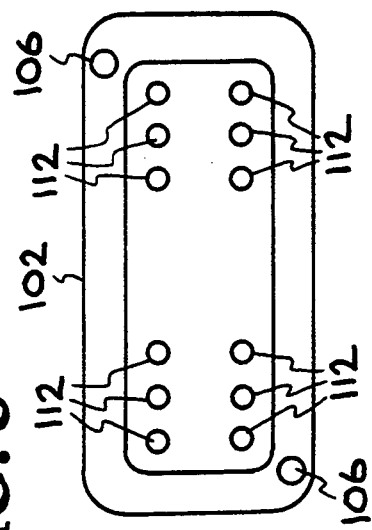
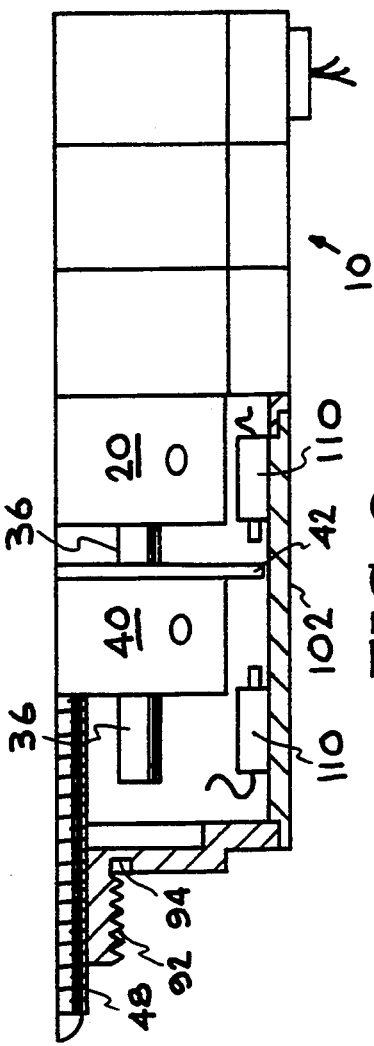

LOW BACKLASH DIRECT DRIVE ACTUATOR

The invention described herein arose in the course of, or under, Contract No. W-7405-ENG48 between the United States Department of Energy and the University of California for the operation of the Lawrence Livermore National Laboratory.

BACKGROUND OF THE INVENTION

1. Field of the Invention

This invention relates to a low backlash direct drive actuator suitable for use in precise deflection of mirrors in a laser optical system.

2. Description of the Related Art

Complex distributed optical systems consisting of over 100 optical minor mounts in some laser optics systems require up to one micro radian mirror tilt control which are continuously adjusted with remote computers. In addition, such components may be embedded in vacuum systems which require remote activation. Usually, mirror tilts are achieved with motorized linear actuators which drive X&Y giroballed mechanisms. Commercial linear drivers exist, but none adequately address backlash, resolution, vacuum compatibility, or cost requirements for commercial deployment in large numbers. In particular, most such commercial mechanisms utilize gearboxes which introduce an unacceptable amount of backlash into the drive mechanism.

There is, therefore, a need for a driver design structure which will satisfactorily address the requirements for a high resolution adjustable laser optics system suitable for use in a commercial environment which will exhibit minimum backlash.

SUMMARY OF THE INVENTION

It is, therefore, an object of the invention to provide a low backlash direct drive actuator, suitable for use in the precise deflection of mirrors in a laser optical system, which exhibits minimum backlash.

The direct drive actuator comprises a stepper motor having at least 200 steps per revolution; a two part hub assembly comprising a cylindrical drive hub coaxially attached to the shaft of the motor and having a plurality of drive pins in one face; a cylindrical driven hub having a plurality of bores in one end thereof in alignment with the drive pins in the drive hub, and a threaded shaft coaxially mounted and secured in an opposite end of the driven hub; and a housing having a central bore therein into which are fitted the drive hub and driven hub. The housing has a motor mount on one end thereof to which is mounted the stepper motor. The housing also has a closed end portion with a threaded opening therein coaxial with the central bore in the housing which receives therein the threaded shaft attached to the driven hub. Limit switches mounted to the housing cooperate with an enlarged lip on the driven hub to limit the lateral travel of the driven hub in the housing, which also acts to limit the lateral travel of the threaded shaft which functions as a lead screw.

BRIEF DESCRIPTION OF THE DRAWINGS

FIG. 2 is a side view of the stepper motor.

FIG. 3 is an end view of the stepper motor, showing the mounting holes thereon.

FIG. 4 is a partially sectioned side view of the hub assembly comprising the drive hub and driven hub.

FIG. 5 is an end view of the cylindrical drive hub, showing the bores formed therein.

FIG. 6 is an end view of the cylindrical driven hub, showing the bores formed therein.

FIG. 7 is a side section view of the housing which contains the hub assembly and to which is mounted the stepper motor.

FIG. 8 is an end view of the housing, showing the motor mount holes therein.

FIG. 9 is a fragmentary side section view of a portion of the hub assembly in the housing illustrating the interaction of the limit switches mounted to the housing with the lip portion on the driven hub.

FIG. 10 is a plan view of the cover plate showing the alternate mounting holes for the limit switches.

DETAILED DESCRIPTION OF THE INVENTION

Figure 1:
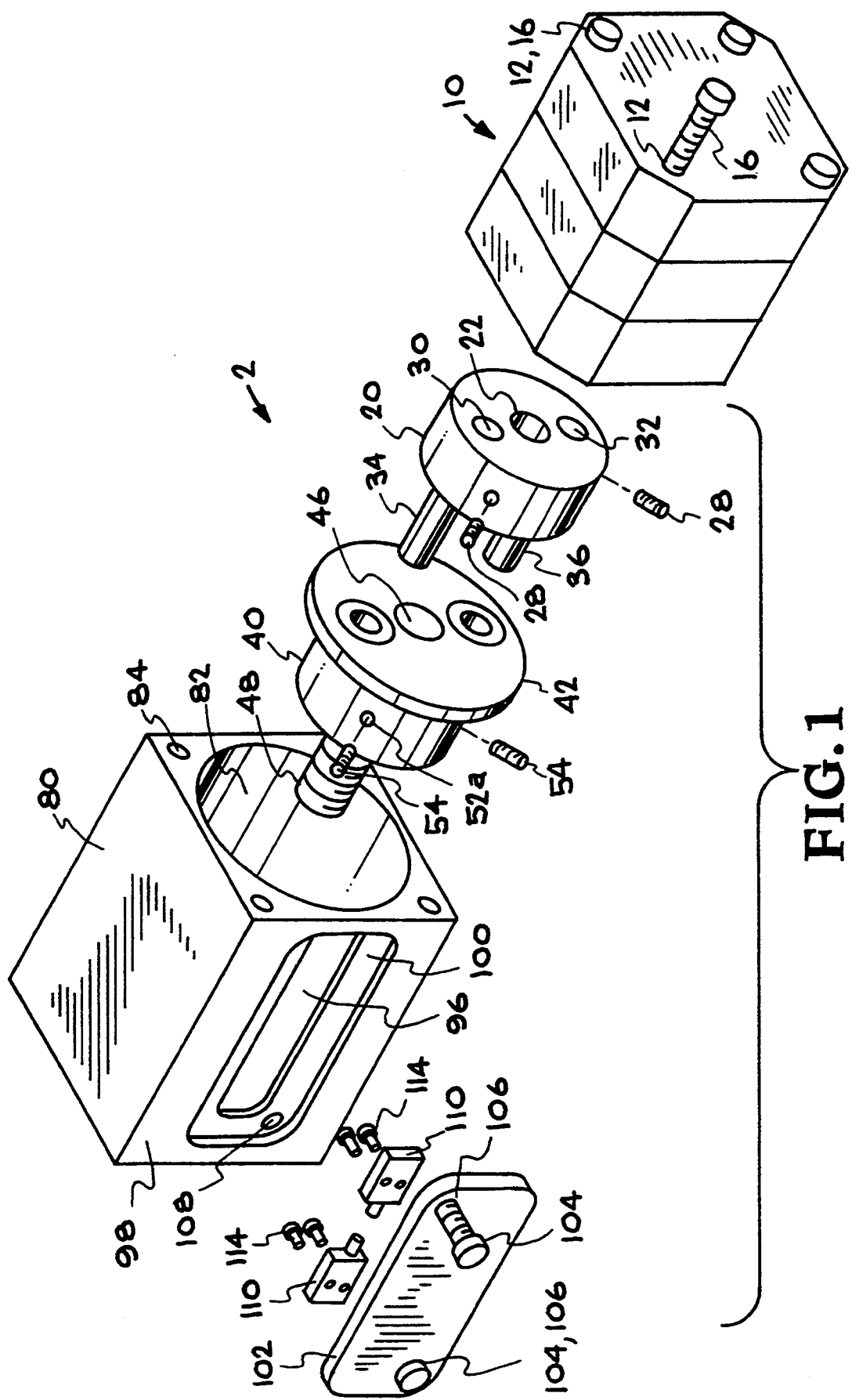
FIG. 1 is an exploded isometric view of the low backlash direct drive actuator of the invention.

Referring now to FIG. 1, the low backlash direct drive actuator of the invention is generally shown at 2 comprising a motor 10, a drive hub 20, a driven hub 40, and a housing 80.

Motor 10 may comprise any motor that can be controlled to a repeatable angular step. For example, motor 10 may comprise a DC motor with an encoder, or a DC motor with a pulse modulated current control. In a preferred embodiment, motor 10 comprises a commercially available stepper motor having at least 200 steps per revolution, i.e. containing at least 200 poles to permit motor 10 to stop at 200 different points per each revolution. Preferably, stepper motor 10 will have 400 steps per revolution, i.e., contain 400 poles to permit precise stopping of motor 10 at four hundred different positions per revolution of motor 10. Such a stepper motor is commercially available from the Oriental Motor Company as Model No. PX243M02AA motor.

Motor 10 may be connected to a commercial available electronic controller (not shown) which permits precise control of the rotation of motor 10, e.g., to permit motor 10 to rotation 1.8 degrees and then stop. Such a commercially available motor controller is also available, for example, from the Oriental Motor Company.

As seen in both FIGS. 1 and 3, motor 10 is further provided with mounting holes 12 through which pass mounting bolts 16 to mount motor 10 to housing 80, as will be described below. Motor 10 also has a drive shaft 18, shown in FIG. 2, which is connected to drive hub 20 as will also be described below.

Drive hub 20, as seen in FIGS. 1, 4, and 5, comprises a cylindrical member having a coaxially bore 22 in face 24 thereof to receive drive shaft 18 of motor 10. A pair of threaded side bores 26a and 26b, which intersects bore 22, each contain a set screw 28 to secure motor shaft 18 in bore 22. Drive hub 20 is further provided with bores 30 and 32 in the face of disk 22, but eccentric to the axis of drive hub 20. Mounted securely in bores 30 and 32, respectively, are drive pins 34 and 36 which are used to drive driven hub 40, as will be described below. Pins 34 and 36 may be steel pins which are respectively press fit into bores 30 and 32. Although drive hub 20 may be constructed of any durable material capable of being machined or molded to form the above-described bores therein, preferably, drive hub 20 is formed of a metal such as steel, brass, or aluminum.

Driven hub 40 also comprises a cylindrical member which may be of the same diameter as drive hub 20.

However, driven hub 40 is provided with an enlarged lip or shoulder portion 42 thereon which cooperates with limit switches to limit the lateral travel of driven hub 40 as will be explained below. Driven hub 40 is provided with a central bore 46 in face 44 therein which is threaded to receive a fine pitch threaded shaft 48 or lead screw such as an 80 pitch thread shaft. Shaft 48 is shown with a rounded head 50 thereon to permit shaft 48 to make line contact, for example, with a mechanism, e.g., a mirror in a laser optical system, to be deflected by lateral movement of shaft 48. A pair of threaded side bores 52a and 52b, which intersects bore 46, each contain a set screw 54 to secure threaded shaft 48 in bore 46.

Also provided in face 44 of cylindrical driven hub 40 are two bores or circular openings 60 and 62 in registry with and having approximately the same diameter as drive pins 34 and 36 to permit drive pins 34 and 36 to be slidable, yet snugly, received in bores 60 and 62. Bores 60 and 62 are preferably formed in cylindrical plastic inserts or bushings 64 and 66 which, in turn, are received in enlarged bores 68 and 70 formed in driven hub 40. The purpose of plastic inserts 64 and 66 is to provide a snug, yet non-binding or galling fit between the walls of bores 60 and 62 and the surfaces of drive pins 34 and 36 to substantially eliminate any backlash between the pans as drive hub 20 turns driven hub 40 through the contact of drive pins 34 and 36 with bushings 64 and 66.

Suitable plastic material which may be used for as such inserts include, for example, Delrin, an acetal plastic resin; nylon; or 1115 Envex, a polyimide plastic filled with molybdenum disulfide.

As previously discussed with respect to drive hub 20, driven hub 40 may be constructed of any durable material capable of being machined or molded to form the above-described bores therein. In one embodiment, driven hub 40 may be formed entirely of the plastic material used to form the bores which receive said drive pins, such as, for example, the aforementioned filled polyimide material. Preferably, however, driven hub 40 is also formed of a metal such as steel, brass, or aluminum.

In order for drive hub 20 and driven hub 40 to properly function together in a manner which will permit precise and controllable linear movement of lead screw 48, while substantially eliminating backlash between the two hubs, it is important that there be precise alignment between pins 34 and 36 on drive hub 20 and receiving bores 60 and 62 in driven hub 40, as well as axial alignment between central bore 22 in drive hub 20, which receives motor drive shaft 18, and central bore 46 of driven hub 40, which receives lead screw 48. Furthermore, the respective diameters of pins 34 and 36 must sufficiently match, respectively the diameters of bores 60 and 62 to ensure a snug, yet slidable, fit therein. It should be noted, in this regard, than pins 34 and 36 need not be the same diameter, but they must match the respective bore in driven hub 40 into which they will be inserted.

One way in which such precise alignment can be assured, is to form drive hub 20 and driven hub 40 from the same stock, with the respective bores formed prior to separation of drive hub 20 from driven hub 40. Thus, for example, using a cylindrical metal rod which has been externally machined down to form external lip 42 thereon, a central bore is formed therein, of approximately the same diameter as shaft 18 of motor 10, which will form coaxial bore 22 of drive hub 20 and central bore 46 of driven hub 40. Bores 30 and 32 are then drilled through the entire length of the cylindrical stock and enlarged counter bores 68 and 70 are formed from the opposite end, coaxial with bores 30 and 32 to a depth corresponding to the thickness of driven hub 40 to be formed from the cylindrical stock. Cylindrical plastic rods, having approximately the same diameter as counter bores 68 and 70, are then press fit into bores 68 and 70 and bores 60 and 62 are, in turn, formed in the plastic rods, using already formed bores 30 and 32 for alignment, to form plastic bushings 64 and 66.

Subsequent severing of the cylindrical stock to form drive hub 20 and driven hub 40, and press fitting of metal drive pins 34 and 36, respectively, into bores 30 and 32 in metal drive hub 20, will result in precise alignment between drive pins 34 and 36 in drive hub 20 and bores 60 and 62 in plastic bushings 64 and 66 in driven hub 40. Other means, such as for example jig boring, may be used for obtaining the desired precise alignment of drive pins 34 and 36 with bores 60 and 62, as well as axial alignment between the hubs, instead of the above described procedure.

Turning now to FIGS. 7 and 8, housing 80 is shown having a central cylindrical bore 82 therein of sufficient dimensions (diameter and depth) to receive both drive hub 20 and driven hub 40, including enlarged lip 42 thereon. Housing 80 is further provided with threaded mounting bores 84 to receive motor mounting bolts 16 therein to permit motor 10 to be secured to housing 80.

Housing 80 contains an end wall 86 which functions as a terminus for central bore 82 therein. End wall 86 is further provided with an enlarged nipple 88 thereon with an internally threaded bore 90 therein which is coaxial with cylindrical opening 82 to receive threaded shaft or lead screw 48. Nipple 88 may be further provided with an external thread 92 to facilitate the mounting of housing 80 to an auxiliary or support structure (not shown). End wall 86 of housing 80 is further provided with a relief portion 94 surrounding nipple 88 to permit flexure of nipple 88, with respect to the remainder of housing 80 to avoid transmission of stress to threaded shaft 48 when housing 80 is mounted to an external structure via external threads 92 on nipple 88.

Housing 80 is further provided with a lateral slot 96 running along one sidewall 98 thereof which provides access to central cylindrical bore 82 therein for purposes of installing one or more limit switches 110 on housing 80 which will engage lip enlarged 42 on driven hub 40. Sidewall 98 of housing 80 is further shown with a recess 100 formed around lateral slot 96 which receives a plate 102 to provide a cover over slot 96. Cover plate 102 is secured to sidewall 98 via bolts 104 which pass through openings 106 in cover plate 102 and are threadedly received in threaded bores 108 in recess 100 of sidewall 98.

Mounted to the inner surface of cover plate 102 are a pair of limit switches 110 which, when cover plate 102 is mounted to sidewall 98, will be engagable by enlarged lip 42 on driven hub 40. Limit switches 110 may be normally closed switches which are placed in series with motor 10 so that actuation of either switch will open the circuit and shut motor 10 off. As shown in FIG. 10, cover plate 102 is provided with a series of threaded bores 112 which receive limiting switch mounting screws 114 and which permit limit switches 110 to be mounted in one of several positions, depending upon the desired limit of lateral travel of driven hub 40 in bore 82 of housing 80.

To assemble actuator 2, driven hub 40, having threaded shaft 48 already assembled thereto, is first inserted into central opening 82 of housing 80 by threading shaft 48 into threaded internal bore 90. Motor 10 and drive hub 20 are assembled together by inserting motor drive shaft 18 into coaxial bore 22 of drive hub 20 and securing drive shaft 18 therein by tightening set screws 28. Then drive hub 20 is inserted into opening 82, with drive pins 34 and 36 thereon respectively inserted into bores 60 and 62 in driven hub 40. Motor 10 is then bolted to housing 80 and cover plate 102 is mounted to sidewall 98 of housing 80 with limit switches 110, mounted to the inner surface of cover plate 102, and respectively positioned on each side of lip 42 on driven hub 40.

When motor 10 is then activated, shaft 18 thereon rotates drive hub 20 which, through drive pins 34 and 36, rotates driven hub 40, thereby rotating threaded shaft 48 secured to driven hub 40. This, in turn, results in lateral movement of both driven hub 40 and shaft 48 thereon with respect to housing 80, drive hub 20, and motor 10. Drive pins 34 and 36 on drive hub 20 then slide, respectively, in bores 60 and 62 during such lateral movement, thus maintaining the rotational alignment between drive hub 20 and driven hub 40 despite the lateral movement of drive hub 40 with respect to drive hub 20.

Furthermore, this lateral movement of driven hub 40, and shaft 48 thereon, with respect to housing 80, causes rounded end 50 on shaft 48 to move away from or toward housing 80, depending upon the direction of rotation. If, for example, rounded end 50 of shaft 48 is bearing against a mirror mount which is spring biased against shaft 48, rotation of motor 10 in one direction will cause lateral movement of the mirror mount in a first direction against the spring bias due to the lateral movement of shaft 48, while rotation of motor 10 in the opposite direction will cause lateral movement of shaft 48 in the opposite direction, i.e., with the spring bias, thereby moving the mirror mount laterally in a second, opposite, direction. When driven hub 40 and threaded shaft 48 have traveled a predetermined lateral distance, enlarged lip 42 on driven hub 40 will engage one or the other of the limit switches 110 thereby shutting off motor 10.

In either direction, however, the amount or extent of rotation of motor 10 can be controlled by the use of a stepper motor as described, and the translation of this rotational motion into lateral motion of shaft 48 is precise, i.e., without backlash, by the snug interaction between drive pins 34 and 36 of drive hub 20 and bores 60 and 62 of driven hub 40, and the precise alignment of the respective drive pins and mating bores.

Thus, the direct drive actuator of the invention provides the desired precise control of the lateral movement of a lead screw while substantially eliminating backlash to thereby provide for accurate and repeatable lateral positioning of the end of the lead screw against an object to be displaced thereby.

While a specific embodiment of the direct drive actuator of the invention has been illustrated and described, in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. A direct drive actuator for providing accurate and repeatable lateral motion of a lead screw which comprises:
   a) a motor having a plurality of steps per revolution;
   b) a cylindrical drive hub coaxially attached to a drive shaft of said motor and having a plurality of drive pins therein;
   c) a cylindrical driven hub having a plurality of bores in one end thereof in alignment with said drive pins in said drive hub and having approximately the same diameter as said pins to thereby snugly receive said pins therein, and a threaded shaft coaxially mounted and secured in an opposite end of said driven hub; and
   d) a housing having a central cylindrical bore therein to receive said drive hub and said driven hub, said housing also having motor mounting means on one end thereof for mounting said stepper motor, and said housing further provided with a closed end portion at an opposite end of said central cylindrical bore with a threaded opening therein coaxial with said central bore in said housing to receive therein said threaded shaft attached to said driven hub.

2. The direct drive actuator of claim 1 wherein said motor has at least 200 steps per revolution.

3. The direct drive actuator of claim 1 wherein said motor has at least 400 steps per revolution.

4. The direct drive actuator of claim 1 wherein said cylindrical drive hub has a coaxial bore in one face thereof to receive said drive shaft of said motor.

5. The direct drive actuator of claim 4 wherein said cylindrical drive hub is further provided with means to secure said drive hub to said motor shaft.

6. The direct drive actuator of claim 5 wherein said cylindrical drive hub is further provided with bores offset to said coaxially bore and in respective alignment with said plurality of bores in said driven hub, and said offset bores each has a drive pin secured therein of approximately the same diameter as the corresponding bore of said plurality of bores in said driven hub.

7. The direct drive actuator of claim 6 wherein said cylindrical drive hub is formed of a metal and said drive pins comprise steel drive pins press fit into said offset bores in said metal hub.

8. The direct drive actuator of claim 1 wherein said cylindrical driven hub is formed with enlarged bores coaxially aligned with said pins on said drive hub, but of larger diameter, and plastic inserts are received in said enlarged bores, each of said plastic inserts having a bore therein of approximately the same diameter as said pins and in alignment with said pins, whereby rotation of said driven hub in either direction by rotation of said motor drive shaft and drive hub attached thereto will occur with substantially no backlash.

9. The direct drive actuator of claim 1 wherein said cylindrical driven hub is formed of a plastic material.

10. The direct drive actuator of claim 1 wherein said cylindrical driven hub is further provided with an external lip of enlarged diameter thereon which is receivable in said central cylindrical bore in said housing; and said housing is further provided with one or more limit switches engagable by said enlarged lip on said driven hub to limit the extent of lateral travel of said driven hub in said bore in said housing, which thereby limits the lateral travel of said threaded shaft secured to said driven shaft.

11. The direct drive actuator of claim 1 wherein said housing is further provided with an external nipple centrally located at said closed end portion of said central cylindrical bore and said threaded opening is formed therein coaxial with said central bore in said housing to receive therein said threaded shaft attached to said driven hub.

12. The direct drive actuator of claim 11 wherein said external nipple is further provided with external threads to facilitate mounting of said housing to a structure having a matching threaded bore.

13. The direct drive actuator of claim 12 wherein stress relief means are provided on said housing adjacent said external threads on said nipple to inhibit transfer to said threaded shaft of stresses in said nipple, with respect to the remainder of said housing, by the mounting of said housing to an external structure via said external threads on said nipple.

14. A direct drive actuator for providing accurate and repeatable lateral motion of a lead screw which comprises:
   a) a motor having at least 200 steps per revolution;
   b) a cylindrical metal drive hub having a coaxial bore formed in one face thereof to receive a drive shaft of said motor, means to secure said drive hub to said motor shaft, and a plurality of metal drive pins secured therein;
   c) a cylindrical driven hub having a plurality of bores in one end thereof with plastic inserts therein in coaxial alignment with said drive pins in said drive hub and having bores formed in said plastic inserts in alignment with said pins and of approximately the same diameter as said pins to thereby snugly, but slidably, receive said pins therein, and a threaded shaft coaxially mounted and secured in an opposite end of said driven hub;
   d) a housing having a central cylindrical bore therein to receive said drive hub and said driven hub, said housing also having motor mounting means on one end thereof for mounting said stepper motor, and said housing further provided with a closed end portion at an opposite end of said central cylindrical bore with a threaded opening therein coaxial with said central bore in said housing to receive therein said threaded shaft attached to said driven hub; and
   e) one or more limit switches engagable by said driven hub to limit the extent of lateral travel of said driven hub in said central cylindrical bore in said housing.

15. The direct drive actuator of claim 14 wherein said motor comprises a stepper motor.

16. The direct drive actuator of claim 15 wherein said stepper motor has at least 400 steps per revolution.

17. The direct drive actuator of claim 14 wherein said cylindrical driven hub is further provided with an external lip of enlarged diameter thereon which is receivable in said central cylindrical bore in said housing and which engages said one or more limit switches to limit the extent of lateral travel of said driven hub in said bore in said housing, which thereby limits the lateral travel of said threaded shaft secured to said driven shaft.

18. The direct drive actuator of claim 14 wherein said housing is further provided with an external nipple centrally located at said closed end portion of said central cylindrical bore, said threaded opening is formed in said nipple coaxial with said central bore in said housing to receive therein said threaded shaft attached to said driven hub, and said external nipple is further provided with external threads to facilitate mounting of said housing to a structure having a matching threaded bore.

19. The direct drive actuator of claim 18 wherein stress relief means are provided on said housing adjacent said threads on said nipple to inhibit transfer to said threaded shaft of stresses in said nipple, with respect to the remainder of said housing, by the mounting of said housing to an external structure via said external threads on said nipple.

20. The direct drive actuator of claim 14 wherein said plastic inserts in said driven hub comprise delrin plastic.

21. A direct drive actuator for providing accurate and repeatable lateral motion of a lead screw which comprises:
   a) a stepper motor having at least 400 steps per revolution;
   b) a cylindrical metal drive hub having:
      i) a coaxial bore formed in one face thereof to receive a drive shaft of said motor;
      ii) means to secure said drive hub to said motor shaft; and
      iii) a plurality of metal drive pins press fit into bores formed in said face of said drive hub;
   c) a cylindrical driven hub comprising:
      i) a plurality of bores in one face thereof with plastic inserts therein in coaxial alignment with said drive pins in said drive hub;
      ii) bores formed in said plastic inserts in alignment with said pins and of approximately the same diameter as said pins to thereby snugly, but slidably, receive said pins therein;
      iii) a threaded shaft coaxially mounted and secured in an opposite face of said cylindrical driven hub; and
      iv) an enlarged external lip on said cylindrical driven hub;
   d) a housing comprising:
      i) a central cylindrical bore therein to receive said drive hub and said driven hub;
      ii) motor mounting means on one end thereof for mounting said stepper motor;
      iii) a closed end portion at an opposite end of said central cylindrical bore of said housing;
      iv) an external nipple centrally located at said closed end portion of said central cylindrical bore, said external nipple provided with external threads to facilitate mounting of said housing to a structure having a matching threaded bore;
      v) a threaded opening in said nipple coaxial with said central bore in said housing to receive therein said threaded shaft attached to said driven hub; and
   e) one or more limit switches engagable by said enlarged lip on said driven hub to limit the extent of lateral travel of said driven hub in said central cylindrical bore in said housing, which thereby limits the lateral travel of said threaded shaft secured to said driven shaft.

* * * * *